United States Patent [19]
Carmillet et al.

[11] Patent Number: 4,685,896
[45] Date of Patent: Aug. 11, 1987

[54] CLUTCH DISK WITH TORSIONAL DAMPER ASSEMBLY

[75] Inventors: Roger Carmillet; Michel Graton, both of Paris; Michel Bacher, Domont, all of France

[73] Assignee: Valeo, Paris, France

[21] Appl. No.: 761,519

[22] Filed: Aug. 1, 1985

[30] Foreign Application Priority Data

Aug. 3, 1984 [FR] France .................... 8412292

[51] Int. Cl.⁴ ............................................ F16D 3/14
[52] U.S. Cl. .................................. 464/68; 192/106.1; 192/106.2; 464/66
[58] Field of Search ............... 192/70.17, 106.1, 106.2; 384/420; 464/64, 66, 67, 68

[56]  References Cited

U.S. PATENT DOCUMENTS

| | | | |
|---|---|---|---|
| 1,386,491 | 8/1921 | Brown, Jr. ............................ | 384/420 |
| 2,985,494 | 5/1961 | Terhorst ............................... | 308/238 |
| 4,212,380 | 7/1980 | Billet ................................... | 192/106.2 |
| 4,222,475 | 9/1980 | Fénart ................................. | 192/106.2 |
| 4,398,625 | 8/1983 | Beccaris ............................. | 464/68 X |
| 4,446,955 | 5/1984 | Lech, Jr. ............................. | 464/68 X |
| 4,453,838 | 6/1984 | Loizeau ........................... | 192/106.2 X |
| 4,520,915 | 6/1985 | Strub ................................. | 192/106.2 |
| 4,570,774 | 2/1986 | Loizeau ............................. | 464/68 X |

FOREIGN PATENT DOCUMENTS 2270491 3/1977 France .

*Primary Examiner*—Daniel P. Stodola
*Attorney, Agent, or Firm*—Charles E. Brown; Charles A. Brown

[57]  ABSTRACT

A torsional damper device, such as a clutch disk for an automobile vehicle, comprises at least two coaxial parts adapted to rotate relative to one another and a bearing disposed radially between them. This bearing comprises two separate parts, one on each side of a diametral plane of the device. Each is locked axially to a respective one of the coaxial parts and provides axial bearing support for the other coaxial part.

19 Claims, 12 Drawing Figures

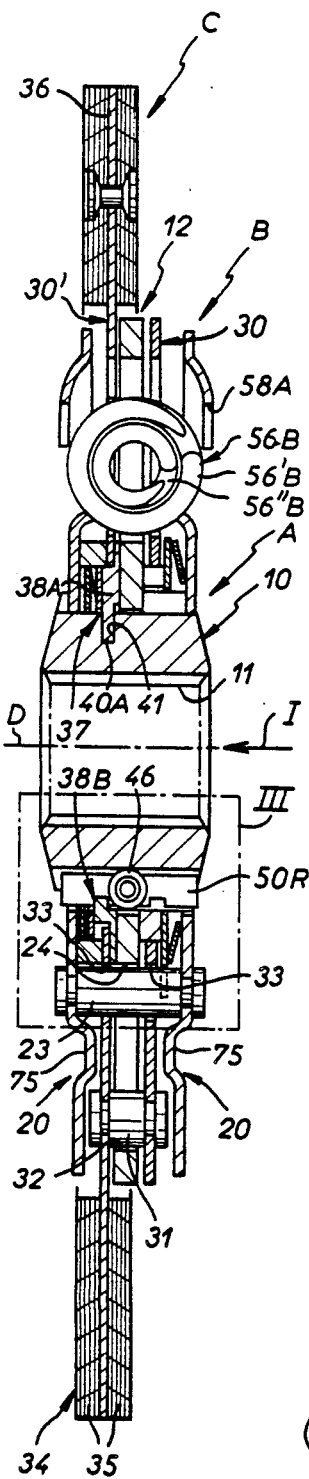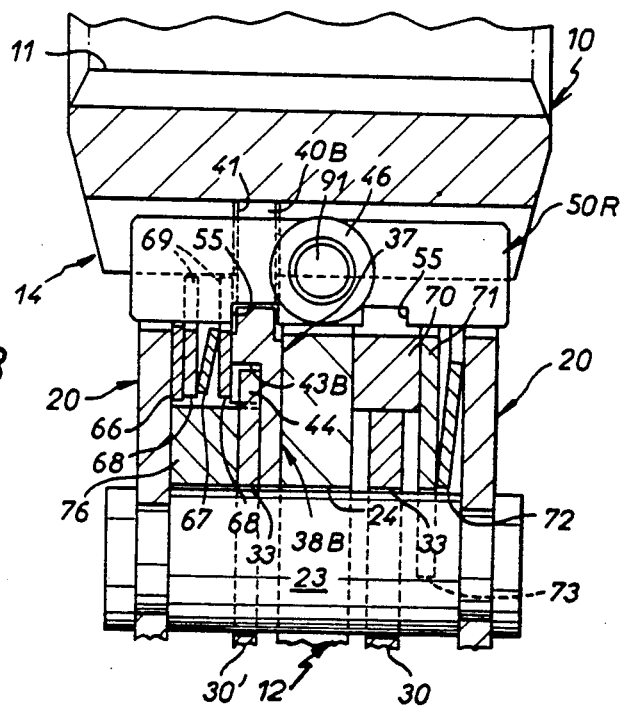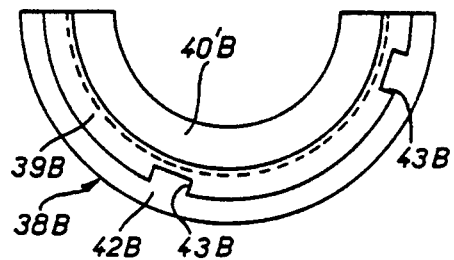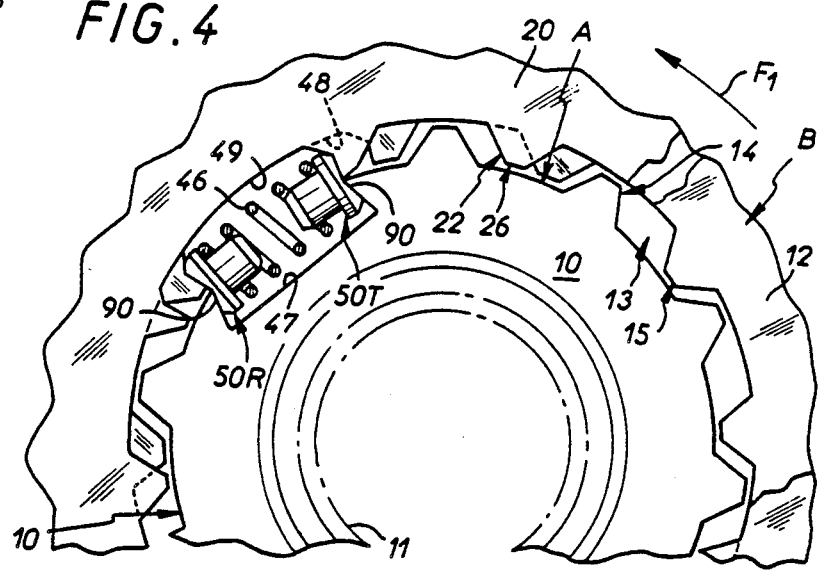

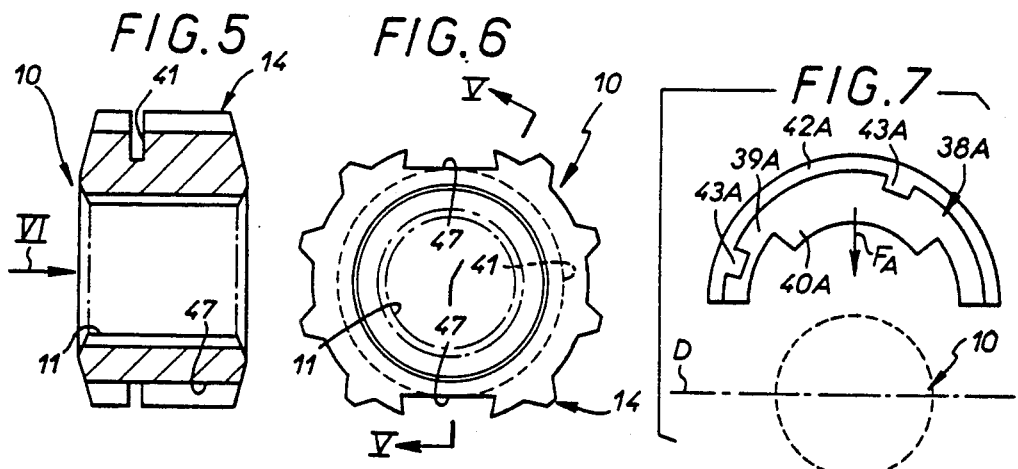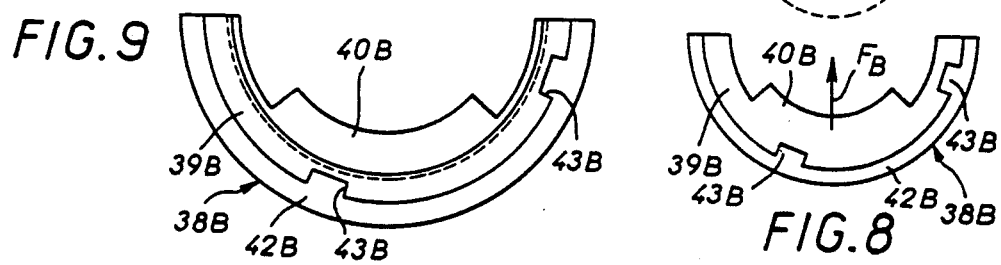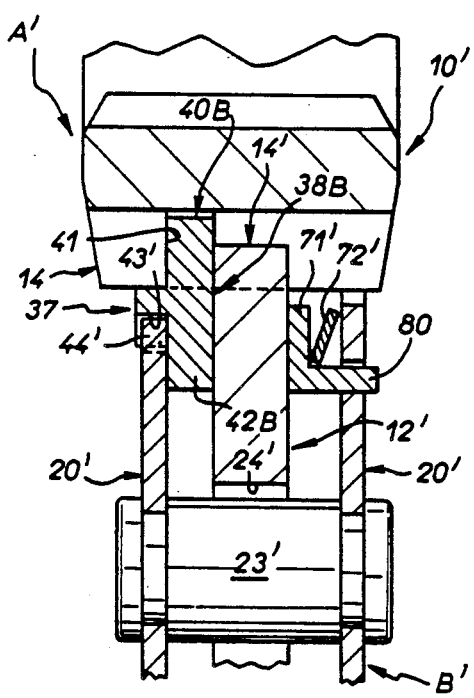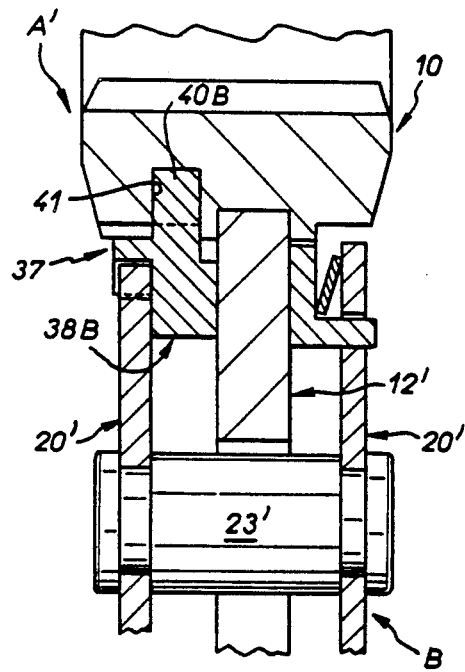

CLUTCH DISK WITH TORSIONAL DAMPER ASSEMBLY

BACKGROUND OF THE INVENTION

1. Field of the Invention

The present invention is generally concerned with torsional damper devices of the kind comprising at least two coaxial parts disposed to rotate relative to one another.

2. Description of the prior art

This type of torsional damper device is normally incorporated in the design of a clutch disk, particularly for automobile vehicles, in which case one rotary part comprises a friction disk designed to be constrained to rotate with a first shaft, in practice a driving shaft and the motor output shaft in the case of an automobile vehicle, whereas another comprises a hub through which it is adapted to be constrained to rotate with a second shaft, in practice a driven shaft and the gearbox input shaft in the case of an automobile vehicle.

In a specific and relatively simple embodiment, that of the rotary parts of a torsional damper device of this kind which comprises a hub also comprises a hub flange around the hub, disposed transversely relative to said hub and constrained to rotate with it, while the other of said rotary parts, that which carries the friction disk, comprises two rings, usually called guide rings, also disposed transversely relative to the hub, around it and at a distance from one another, with one on each axial side of the hub flange, and constrained to rotate together.

In more complex embodiments the hub flange, detached from the hub, itself forms a part disposed to rotate relative to said hub and/or, apart from the guide rings, and disposed transversely relative to the hub, other flanges which, like the guide rings, extend annularly around the hub.

In all cases there are also employed circumferentially acting elastic means disposed circumferentially between the rotary parts constituting the torsional damper device and adapted to be operative circumferentially between them for part at least of their relative angular displacement, for the purpose of filtering vibration which may arise at any point in the kinematic system in which the torsional damper device is incorporated, extending from the motor to the driven road wheels in the case of an automobile vehicle, together with friction means for damping such vibration.

These circumferentially acting elastic means and, for the most part, these friction means are not relevant in the present context.

The only part of relevance here is the bearing which it is also usual to insert radially between two of the rotary parts constituting a torsional damper device of the kind in question.

More often than not this bearing is fabricated from a synthetic material and at present it is usually of unitary construction, its essential function being to center the rotary parts between which it is inserted relative to one another.

Sometimes it has the additional, but in fact ancillary, function of constituting part of the friction means employed to achieve the required damping.

A general object of the present invention is an arrangement enabling this bearing to be given an advantageous third function, to the benefit of the device as a whole.

SUMMARY OF THE INVENTION

The present invention consists in a torsional damper device comprising at least two coaxial parts adapted to rotate relative to one another and a bearing disposed radially between said coaxial parts, said bearing comprising two separate parts disposed one on each side of a diametral plane of the device, each locked axially to a respective one of said coaxial parts and providing axial bearing support for the other of said coaxial parts.

When, as is the usual case in practice, one of the rotary parts comprises a hub while the other comprises two flanges around the hub, spaced from one another, disposed transversely relative to the hub and constrained to rotate together, the two constituent parts of the bearing in accordance with the invention are locked axially to the hub and, disposed axially between the two flanges around the hub, retain said flanges axially relative to said hub.

In other words, over and above its usual centering and, possibly, friction functions, the bearing in accordance with the invention itself procures, or is at least adapted itself to procure, axial retention of the two rotary parts constituting a torsional damper device of the kind concerned relative to one another.

In certain cases at least it therefore provides a simple and economic solution to the problem of retaining these rotary parts axially relative to one another.

This is the case, in particular, in relatively complex embodiments of a torsional damper device of this kind incorporating multiple annular members and flanges of various kinds.

However, it also offers the advantage of permitting a simplification of the manufacturing process in simpler embodiments.

For example, in the case of a torsional damper device comprising, as well as two guide rings, a single hub flange locked to the hub, it is usual to fabricate the hub flange as an annular part which, separate from said hub and having a toothed portion at its inside periphery, is attached to the hub by force fitting it thereto.

Although an arrangement of this kind has proved satisfactory and may continue to do so, it has the disadvantage of needing significant forces to be developed in order to employ it.

With a bearing in two parts in accordance with the invention the hub may simply be provided in advance with a toothed portion on its periphery complementary to that on the hub flange, the fitting of the latter then reducing to a simple axial engagement, with no particular force being developed, a two-part bearing in accordance with the invention then procuring the necessary axial retention of said hub flange relative to said hub.

Other objects and advantage will appear from the following description of examples of the invention, when considered in connection with the accompanying drawings, and the novel features will be particularly pointed out in the appended claims.

BRIEF DESCRIPTION OF THE DRAWINGS

FIG. 2 is a view of it in axial cross-section on the broken line II—II in FIG. 1.

FIG. 3 shows to a larger scale the detail of FIG. 2 marked by the box III thereon.

FIG. 4 shows, to the same scale as FIG. 3 and partially cut away, the detail of FIG. 1 marked by the box IV thereon.

FIG. 5 is a view in axial cross-section of the hub which the torsional damper device in accordance with the invention comprises, shown in isolation.

FIG. 6 is a view in elevation of this hub as seen in the direction of the arrow VI in FIG. 5.

FIG. 7 shows to a reduced scale one of the component parts of a bearing employed in the torsional damper device in accordance with the invention, shown in isolation.

FIG. 8 is a view in elevation of the other of said component parts of this bearing, to the same scale as FIG. 7.

FIG. 9 is a view repeating that of FIG. 8 to a larger scale.

FIG. 10 is a partial view in axial cross-section analogous to that of FIG. 3 and relates to another torsional damper device with two-part bearing in accordance with the invention.

FIG. 11 is a view analogous to that of FIG. 10 and concerning an alternative embodiment.

FIG. 12 is an elevational view similar to FIG. 9 showing a modified form of bearing member.

DESCRIPTION OF THE PREFERRED EMBODIMENTS

Figure 1:
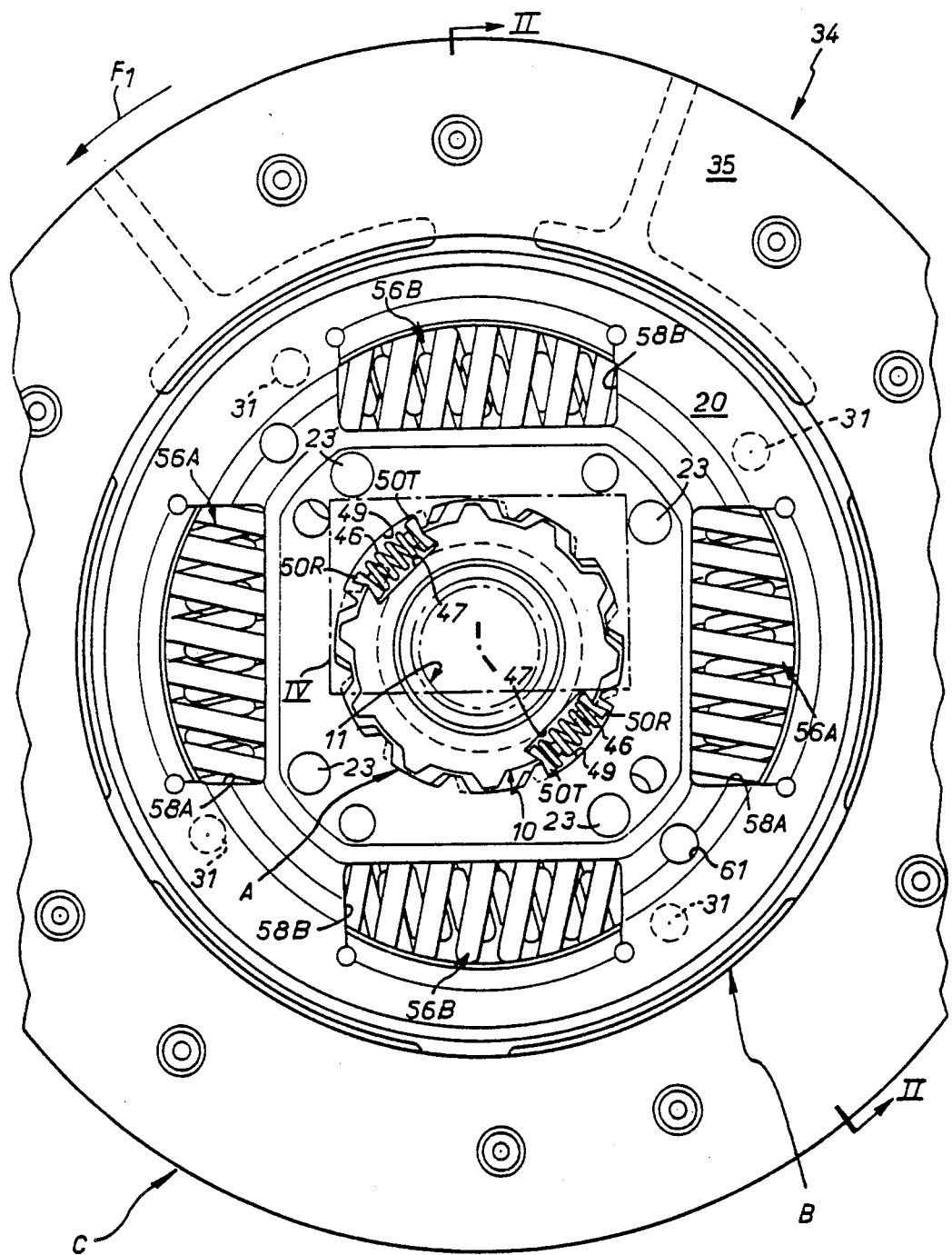
FIG. 1 is a partial view in elevation of a torsional damper device in accordance with the invention as seen in the direction of the arrow I in FIG. 2.

The figures illustrate, by way of example, the application of the invention to a clutch disk, especially for automobile vehicles.

FIGS. 1 through 9 are more particularly concerned with the case where the torsional damper device which constitutes this clutch disk comprises three coaxial parts A, B and C disposed to rotate relative to one another in pairs within defined limits of relative angular displacement against elastic means, commonly called circumferentially acting elastic means, adapted to be operative circumferentially between them over part at least of such relative angular displacement.

This torsional damper device will not be described in complete detail here.

Only those component parts of it necessary to understand the present invention will be specifically described.

The first coaxial part A consists of a simple hub 10 designed to be constrained to rotate with a shaft (not shown), in practice the input shaft of the gearbox of the vehicle concerned, forming the driven shaft.

To this end the internal bore 11 in the hub 10 is splined, for example, as shown here.

The second coaxial part B comprises a flange 12 commonly called the hub flange forming a transverse annular part around the hub 10, with meshing means 13 implemented with clearance disposed between it and said hub 10.

The meshing means 13 with clearance comprise two toothed portions 14 and 15, one (14) on the hub 10, more precisely on the outside periphery thereof, and the other (15) on said hub flange 12, more precisely on the edge of the inside periphery thereof (FIG. 4).

In the embodiment shown, and for reasons which will emerge hereinafter, the toothed portion 14 on the hub 10 extends axially over the entire length thereof, (FIG. 5).

Likewise, the toothed portion 15 on the hub flange 12 extends axially over the entire length of its edge.

The coaxial part B further comprises at least one further flange 20, referred to hereinafter for convenience as the auxiliary flange, which, like the hub flange 12 with which it is associated and to which it is parallel, forms a transverse annular part around the hub 10, with meshing means 22 implemented with clearance disposed between it and the latter.

In the embodiment shown, there are therefore two auxiliary flanges 20 parallel to and axially spaced from one another, one on each side of the hub flange 12, coupled to one another by axial spacers 23 passing through holes 24 formed in the hub flange 12 for this purpose.

In practice four spacers 23 are provided in this way, in pairs of substantially 90° to one another, with the same number of openings 24 in the hub flange 12.

Each of these axial spacers 23 is crimped at its ends to the auxiliary flanges 20 which it couples together.

The meshing means 22 with clearance disposed between the hub 10 and the auxiliary flanges 20 are in corresponding axial relationship on the two auxiliary flanges 20.

For each of these auxiliary flanges 20 they comprise two conjugate toothed portions, one on the hub 10 and the other on an auxiliary flange 20.

In practice the toothed portion 14 on the hub 10 extends axially over the entire length thereof and is common to the hub flange 12 and to the auxiliary flanges 20.

In other words, the hub 10 comprises a single toothed portion 14 for cooperation with the hub flange 12 and with the auxiliary flanges 20.

As with the hub flange 12, the conjugate toothed portion 26 of the auxiliary flanges 20 is formed at the inside periphery of these auxiliary flanges 20, as by cutting, for example, extending in practice over the entire length of the edge of the latter.

The third coaxial part C also comprises at least one flange 30 which, like the hub flange 12 to which it is parallel, forms a transverse annular part around the hub 10 but which, unlike the hub flange 12 and thus the auxiliary flanges 20, has no direct relationship with the hub 10, that is to say there are no meshing means with clearance disposed between it and the latter.

In the embodiment shown the coaxial part C comprises two flanges 30, 30' parallel to and axially spaced from one another, one on each side of the hub flange 12, coupled together by axial spacers 31 passing through opening 32 formed for this purpose in said hub flange 12.

In practice there are thus four axial spacers 31 disposed in pairs at substantially 90° to one another, with the same number of openings 32 in the hub flange 12.

In the embodiment shown, the flanges 30, 30' are placed in the immediate vicinity of the hub flange 12, the auxiliary flanges 20 being themselves disposed one on each side of the combination consisting of the hub flange 12 and the flanges 30, 30'.

In other words, in this embodiment the auxiliary flanges 20 are the outermost flanges, with regard to the axial direction, of the torsional damper device concerned.

As a result, and as for the hub flange 12, the axial spacers 23 which couple them to one another have to pass through openings 33 formed in the flanges 30, 30' for this purpose.

The coaxial part C further comprises a friction disk 34.

In the embodiment shown, the flange of the friction disk is formed directly by the previously described flange 30', which constitutes beyond the periphery of the hub flange 12, the auxiliary flanges 20 and the flange 30 with which it is associated sectors 36 with two friction facings 35 attached one to each side thereof.

By clamping these friction facings 35 between two plates, namely a pressure plate and a reaction plate (not shown), the coaxial part C may be constrained to rotate with a shaft.

In practice this is a driving shaft.

In the case of a clutch disk for automobile vehicles, it is the output shaft of the motor of the vehicle.

For centering the coaxial part C relative to the coaxial part A a bearing 37 is radially inserted between one of the flanges 30, 30' of this coaxial part C and the hub 10 constituting the coaxial part A.

In the embodiment shown, the bearing 37 is disposed between the inside periphery of the flange 30' and the hub 10.

In accordance with the invention this bearing 37 consists of two separate parts 38A, 38B which are disposed one on each side of a common diametral plane D of the assembly and which, each interlocked axially with one of the coaxial parts A and C in question, provides axial bearing support for the other of the latter.

The position of the diametral plane D concerned is shown in chain-dotted line in FIGS. 2 and 7.

In practice, in the embodiment shown, the two component parts 38A, 38B of the bearing 37 are interlocked axially with the hub 10 forming the part A and they are disposed axially between the two flanges 30, 31' of the coaxial part C encircling said hub 10.

The two parts 38A, 38B constituting the bearing 37 in accordance with the invention are shown in isolation in FIGS. 7 and 8, respectively.

In the embodiment shown, each subtends an angle of substantially 180° at the center and they therefore mate together on the diametral plane D on respective opposite sides of which they lie.

Furthermore, in the embodiment shown, the two component parts 38A, 38B of the bearing 37 in accordance with the invention each comprise a half-ring 39A, 39B which, at its inside periphery and at one axial end, features circumferentially over part at least of its length, and in practice in the embodiment shown over part only thereof, a tab 40A, 40B which projects in a first radial direction, in practice towards the axis of the device, and by means of which they are individually and conjointly engaged in an annular transverse groove 41 formed for this purpose in the outside periphery of the hub 10.

In practice, to achieve the required centering of the coaxial part C relative to the coaxial part A, that is to say of the flanges 30, 30' relative to the hub 10, the inside edge of this tab 40A, 40B is allowed to cooperate with the bottom of the groove 41 in the hub 10 in which it is engaged.

At its outside periphery the ring 39A, 39B of each of the parts 38A, 38B constituting the bearing 37 in accordance with the invention features over part at least of its circumference, and in practice in the embodiment shown over its entire circumference, at the opposite axial end, a collar 42A, 42B which projects radially, like the associated tab 40A, 40B but in the opposite direction, and by means of which said parts 38A, 38B provide the required axial bearing support for the flanges 30, 30' of the coaxial part C, being inserted, as indicated hereinabove, between the flanges 30, 30'.

In practice, the collar 42A, 42B of each of the component parts of the bearing 37 in accordance with the invention is inserted axially between the flange 30' and the hub flange 12, being in contact with said hub flange 12.

In the embodiment shown this collar 42A, 42B is thinner than the associated tab 40A, 40B, which itself is thinner than the main part of the corresponding ring 39A, 39B, and is axially offset relative to said tab 40A, 40B.

In other words, in this embodiment, the collar 42A, 42B on each of the parts 38A, 38B constituting the bearing 37 in accordance with the invention lies in a transverse plane different to that in which its tab 40A, 40B lies.

Finally, the ring 39A, 39B from which a collar 42A, 42B of this kind originates features at its outside periphery spaced notches 43A, 43B into which penetrate radially, in order to constrain them to rotate with the coaxial part C, teeth 44 projecting radially to this end towards the axis of the device from the inside periphery of the flange 30' forming part of this coaxial part C (FIG. 3).

In the embodiment shown the portion of a ring 39A, 39B of this kind featuring these notches 43A, 43B is axially spaced from the median transverse plane of the device passing through the corresponding tab 40A, 40B.

Furthermore, in this embodiment, the groove 41 in the hub 10 is common to the two component parts 38A, 38B of the bearing 37 in accordance with the invention.

The circumferentially acting elastic means disposed between the coaxial parts A, B and C are not relevant in this context and, being well-known per se, they will not be described in detail.

In the embodiment shown those disposed between the coaxial part A and the coaxial part B comprise, for the purose of filtering so-called neutral or idling noise, two coil springs 46 of relatively low stiffness which, disposed substantially tangentially relative to a circumference of the device, in diametrically opposite positions relative to one another, are each accommodated in part in a notch 47 constituting a local interruption of the toothed portion 14 on the hub 10 and in part in notches 48, 49 constituting local interruptions of the toothed portion 15 on the hub flange 12 and that 22 on the auxiliary flanges 20, with bars 50T, 50R disposed at their ends between them and the shoulders forming the corresponding circumferential end edges of the notches 47, 48, 49 concerned.

In the embodiment shown, and as is best seen in FIG. 6, the bottom of the groove 41 in the hub 10 is on a circle tangential to the bottom of the notches 47.

For the purpose of retaining it axially, each of the bars 50T, 50R has a notch 55 through which it is interlocked to the bearing 37, more precisely the corresponding part 38A, 38B thereof.

For the purpose of its cooperation with the shoulders forming the circumferential end edges of the notches 47, 48, 49 specified hereinabove, it features in its back a V-shaped depression 90 while, for centering the spring 46 which bears on it, it comprises a projecting peg 91, as described in French Pat. No. 2 270 491 of Feb. 21, 1977.

In practice, the bearing 37 being axially spaced from the median transverse plane of the device which passes through the axes of the springs 46, each of the bars 50T, 50R has two identical notches 55 disposed one on each side of this median transverse plane, in symmetrical relationship to the peg 91 which it comprises, to enable it to be positioned in either axial sense in the device, only one of said notches 55 being used for this purpose after it is so fitted.

As will have been understood, it is by virtue of the spaces left circumferentially between the tabs 40A, 40B of the two parts 38A, 38B constituting the bearing 37 in accordance with the invention that provision is made for accommodating the combinations formed by the bars 50T, 50R and the springs 46, the circumferential length of said tabs 40A, 40B being specifically reduced to this end in this embodiment.

There is preferably a slight circumferential clearance between each of the bars 50T, 50R and the corresponding circumferential end of the tab 40A, 40B concerned.

As for the circumferentially acting elastic means disposed between the coaxial parts B and C, these comprise two elastic members 56A and, alternating with them, two elastic members 56B, each of which, stiffer than the aforementioned springs 46, consists of two coaxial coil springs 56'A, 56"A and 56'B, 56"'B and is at least partially accommodated, on the one hand, in an opening in the hub flange 12 and in openings in the auxiliary flanges 20, formed in practice by holes in said hub flange 12 and said auxiliary flanges 20, and, on the other hand, in openings in the flanges 30, 30', also formed in practice by holes in the latter.

As will be noted, the auxiliary flanges 20 forming the axially outermost flanges of the torsional damper device and featuring openings 58A, 58B in which are individually and partially accommodated the elastic members 56A, 56B, constitute, in the case of these elastic members 56A, 56B, what are usually called "guide rings", one at least of the radial end edges of their openings 58A, 58B, that which is radially outermost, for example, being advantageously louver-shaped to this end, as shown here.

Furthermore, to offer good bearing support to the elastic members 56A, 56B, each of the auxiliary flanges 20 features an annular stamped portion 75 in the area of the openings projecting axially inwards (FIG. 2).

Friction means are provided between the various parts A, B and C constituting the torsional damper device, in the manner known per se.

In the embodiment shown these comprise, apart from the bearing 37 already described, and more precisely the collars 42A, 42B of the two parts 38A, 38B constituting same, a friction ring 66 in contact with the inside surface of that of the auxiliary flanges 20 which is on the same side of the hub flange 12 as the bearing 37, acted on by axially acting elastic means continuously urging it into bearing engagement against this auxiliary flange 20 (FIG. 3).

In practice these axially acting elastic means consist of a spring washer 67 of the Belleville washer type disposed between two distribution rings 68 disposed one in contact with the friction ring 66 and the other in contact with the bearing 37, both constrained to rotate with the hub 10 by teeth 69 interlocking with the toothed portion 14 on the hub 10.

In the embodiment shown the friction means operative between the parts A, B and C constituting the torsional damper device in accordance with the invention further comprise a friction ring 70 radially disposed at the inside periphery of the flange 30, between the latter and the hub 10.

This friction ring 70 is axially in contact, on the one hand, with the hub flange 12 and, on the other hand, with a distribution ring 71 which is in turn acted on by axially acting elastic means, in practice a Belleville spring washer 72, bearing on the adjacent auxiliary flange 20 and engaged, through fingers 73 projecting radially from its outside periphery, with at least one of the axial spacers 23, by which it is therefore constrained to rotate with the auxiliary flanges 20.

Finally, the friction means between the parts A, B and C constituting the torsional damper device in accordance with the invention comprise, in the embodiment shown, a friction ring 76 disposed axially between the flange 30' and the auxiliary flange 20 near the latter and extending radially between the axial spacers 23 and the aforementioned rings 66, 67, 68.

Moreover, although to some extent the centering of the auxiliary flanges 20 relative to the hub 10 may be effected by their toothed portion 26, such centering is preferably achieved by the axial spacers 23, by virtue of cooperation thereof with the openings 33 in the flanges 30, 30' through which they pass, these flanges 30, 30' being themselves centered on the hub 10 by the bearing 37 in accordance with the invention, as described above.

The hub flange 12 may likewise be centered by these axial spacers 23; this may also be achieved by means of the axial spacers 31.

The operation of the torsional damper device thus constituted in service is not relevant here.

For this reason it will not be described.

Only of relevance here is the assembly of the torsional damper device.

With regard to the bearing 37, and as shown in FIGS. 7 and 8, this assembly is effected by radially offering up to the hub 10 the two parts 38A, 38B constituting it, in opposite radial directions as schematically represented by the arrows FA and FB in FIGS. 7 and 8, and after previously fitting the bars 50T, 50R and the springs 46 extending circumferentially between these.

Having their tab 40A, 40B engaged in the groove 41 in the hub 10, the parts 38A, 38B constituting the bearing 37 in accordance with the invention are then axially locked to the hub 10.

The same applies to the bars 50T, 50R, these being then interlocked through their notch 55 with the ring 42A, 42B of the corresponding part 38A, 38B of the bearing 37.

All that is then needed is to fit in the conventional manner the elastic members 56A and 56B and, also in the conventional manner, to assemble the axial stack of the various flanges and annular members employed on each side of the previously fitted bearing 37.

It is to be understood that the flanges 30, 30' of the coaxial part C are attached to one another by the axial spacers 31 before fitting the guide rings 20, which are subsequently attached to one another by the axial spacers 23.

Moreover, as will be noted, the hub 10, the hub flange 12, the springs 46 and the corresponding bars 50T, 50R, the flanges 30, 30' and therefore the friction disk formed by the flange 30' may advantageously constitute, after fitting of the axial spacers 31, a unitary sub-assembly adapted to be pre-assembled individually and to be handled as such, prior to fitting other components of the torsional damper device concerned.

Be this as it may, locked axially to the hub 10 and providing axial bearing support to the flanges 30, 30' of the coaxial part C, being inserted axially between these, the two parts 38A, 38B constituting the bearing 37 in accordance with the invention advantageously of themselves secure axial retention of these flanges 30, 30' and thus of the coaxial part C relative to said hub 10.

The same applies to the hub flange 12 of the coaxial part B, since this lies between the flanges 30, 30' of the coaxial part C.

The same also applies, therefore, to the guide rings 20 of the coaxial part B, these lying one on either side of the flanges 30 of the coaxial part C.

It is therefore the combination of all these component parts to the torsional damper device concerned that the bearing 37 in accordance with the invention locks axially to the hub 10 thereof.

FIG. 10 illustrates the application of the invention to the simpler case where the torsional damper device concerned comprises only two coaxial parts A', B'.

Apart from a hub 10', the coaxial part A' comprises, in this case, a hub flange 12' constrained to rotate with the hub 10'.

The coaxial part B' conjointly comprises, in this case, two guide rings 20' disposed one on each side of the hub flange 12' and fastened to one another by axial spacers 23' passing with clearance through openings 24' provided for this purpose in the hub flange 12'.

These are, of course, guide rings 20, 20' disposed around the hub 10' and unrestrained relative thereto.

One of them carries a friction disk at its periphery, although this is not visible in the figure.

Disposed radially between one of the guide rings 20, 20' and the hub 10' is a bearing 37 formed, in accordance with the invention, in two separate parts, one only of which, the part 38B, is visible in FIG. 10.

By a tab 40B it is interlocked with a groove 41 in the hub 10'; by a collar 42B it is inserted axially between the guide rings 20', more precisely between one of these and the hub flange 12'.

In the embodiment shown, the collar 42B lies in substantially the same transverse plane as the tab 40B.

Be this as it may, it may if required extend over the entire circumferential length of the ring 39B which carries it, and thus of the part 38B concerned.

It is to be understood that the provisions described hereinabove in respect of the part 38B of the bearing 37 apply identically to the other part of the latter.

As previously, the bearing 37 is also constrained to rotate with the coaxial part B', that of the guide rings 20' which it flanks featuring on its inside periphery teeth 44' by means of which it is interlocked with notches 43' formed to this end in both component parts of the bearing 37.

Also as previously, the bearing 37 thus of itself forms part of the friction means operative between the coaxial part A', B'.

In the embodiment shown these friction means are completed by a friction ring 71' disposed on the other side of the hub flange 12' and locked by lugs 80 to the corresponding guide ring 20', being acted on by a Belleville spring washer 72' bearing on the latter.

Finally, and as previously, circumferentially acting elastic means not visible in the figure are operative circumferentially in the manner known per se between the coaxial parts A', B'.

As will be noted, and as previously, being locked axially to the hub 10' and inserted axially between the guide rings 20', the bearing 37 advantageously of itself secures axial retention of the guide rings 20' relative to said hub 10'.

The same applies to the hub flange 12'.

Thus, if desired, it is not necessary for the hub flange 12' to be individually locked axially to the hub 10'.

To the contrary, it may be unrestricted relative thereto in the axial direction.

It is only necessary that it be constrained to rotate with the hub 10'.

For example, it may feature at its inside periphery a toothed portion 14' circumferentially complementary to that 14 of the hub 10'.

Fitting it to the hub 10' is thus advantageously simplified.

However, if desired, and in a complementary manner, it may also be individually locked axially to the hub 10', as shown by way of example in FIG. 11, or even be unitary therewith.

In the embodiment shown in FIG. 10, if required and as shown, instead of centering achieved through the bottom of the groove 41 in the hub, centering may be achieved through the crest of the toothed portion 14 of the latter, the portion of the ring 39A, 39B of each of the parts 38A, 38B constituting the bearing 37 in accordance with the invention which, featuring the notches 43A, 43B, projects axially relative to the main part of the ring 39A, 39B then bearing on this crest.

In the embodiment shown, the flanges 30, 30' are centered and constrained to rotate with the bearing 37 in a common transverse plane of the assembly.

Referring now to FIG. 12, it will be seen that there is illustrated another form of bearing part which is identical to the bearing part 38B of FIG. 9 with like components being identified by like reference numerals. However, the bearing part of FIG. 12 has a continuous tab 40'B as opposed to the partial tab 40B of the bearing part of FIG. 9.

It will be understood that various changes in the details, materials and arrangements of parts which have been herein described and illustrated in order to explain the nature of the invention may be made by those skilled in the art within the principle and scope of the invention as expressed in the appended claims.

For example, for the purposes of rotational interlocking with one of the flanges, the ring of each of the parts constituting the bearing in accordance with the invention may feature projections instead of notches, complementary recesses being then provided at the inside periphery of the flange.

Also, the field of application of the invention is not limited to that of the torsional damper devices specifically described and shown or to clutch disks for automobile vehicles.

To the contrary it covers any type of torsional damper device comprising two coaxial parts disposed to rotate relative to one another.

We claim:

1. A torsional damper device comprising at least two coaxial parts mounted for rotation relative to one another, torsion damping means operatively interposed between said coaxial parts, a bearing disposed radially between said two coaxial parts, said bearing comprising two separate bearing parts disposed one on each side of a diametral plane of the device, each of said separate bearing parts being locked axially in one of said coaxial parts and providing an axial bearing support for the other of said coaxial parts, each of said separate bearing parts having a radial tab inserted in a transverse groove in said one of said coaxial parts and a radial collar defining said axial bearing support for said other coaxial part, said tabs and said collars extending in opposite radial directions, and radial restraining means limiting radial separation of said bearing parts.

2. Torsional damper device according to claim 1, wherein said transverse groove is common to both said separate bearing parts.

3. Torsional damper device according to claim 1, wherein said tab on each of said separate bearing parts extends over part only of its length as measured in the circumferential direction.

4. Torsional damper device according to claim 1, wherein said tab on each of said separate bearing parts extends over its entire length as measured in the circumferential direction.

5. Torsional damper device according to claim 1, wherein said tab and said collar on each of said separate bearing parts are axially offset from each other.

6. Torsional damper device according to claim 1, wherein each of said separate bearing parts subtends at its center an angle of substantially 180°.

7. Torsional damper device according to claim 1, wherein one of said coaxial parts comprises a hub and the other comprises two flanges around said hub, spaced from one another, disposed transversely relative to said hub and constrained to rotate together, and said two separate bearing parts are locked axially to said hub, disposed axially between said flanges and retain said flanges axially relative to said hub.

8. A torsional damper device according to claim 1, wherein said bearing defines means for centering said other coaxial part on said one coaxial part.

9. A torsional damper device according to claim 8, wherein said one coaxial part comprises a hub and said other coaxial part comprises at least one transverse flange.

10. A torsional damper device according to claim 8, wherein said bearing further defines part of friction means operatively disposed between said coaxial parts.

11. A torsional damper device according to claim 8, wherein said one coaxial part includes a hub flange, said other coaxial part comprises two transverse flanges disposed one on each side of said hub flange, and said bearing is arranged between one of said two flanges and said hub flange.

12. A torsional damper device according to claim 11, wherein said one of said two flanges meshes with said bearing.

13. A torsional damper device according to claim 11, wherein said bearing defines friction means operatively disposed between said one of said two flanges and said hub flange.

14. A torsional damper device comprising three coaxial parts mounted for rotation relative to one another, torsional damping means being operatively interposed between said coaxial parts, one of said coaxial parts comprising a hub, a central hub flange being mounted on said hub, a second of said coaxial parts comprising axially outermost guide rings fixed together and arranged around said hub, a third of said coaxial parts comprising intermediate flanges fixed together and disposed between said central flange and respective guide rings, a bearing centering said intermediate flanges on said hub and comprising two separate bearing parts disposed one on each side of a diametral plane of the device, each of said separate bearing parts being locked axially in said hub and providing an axial bearing support for at least said third coaxial part, each of said separate bearing parts having a radially inwardly extending tab inserted in a transverse groove in said hub and a radially outwardly extending collar defining said axial bearing support for said third coaxial part received between said hub flange and one of said intermediate flanges, and radial restraining means limiting radial separation of said bearing parts.

15. A torsional damper device according to claim 14, wherein said hub flange is freely axially mounted on said hub, and said bearing also defines an axial bearing support for said hub flange and said second coaxial part.

16. A torsional damper device according to claim 14, wherein said collars of said bearing are part of friction means operatively interposed between said one intermediate flange of said third coaxial part and said hub flange.

17. A torsional damper device comprising two coaxial parts mounted for rotation relative to each other, torsional damping means operatively interposed between said coaxial parts, one of said coaxial parts comprising a hub, a hub flange being arranged around said hub, the other of said coaxial parts comprising two guide rings fixed together and arranged around said hub and disposed on respective sides of said hub flange, a bearing disposed radially between said hub and one of said guide rings and axially between said one guide ring and said hub flange, said bearing comprising two separate bearing parts disposed one on each side of a diametral plane of the device, each of said separate bearing parts having a radially inwardly extending tab inserted in a transverse groove in said hub for locking the separate bearing part in said hub, each of said separate bearing parts having a radially outwardly collar defining an axial bearing support for said one guide ring, and radial restraining means limiting radial separation of said bearing parts.

18. A torsional damper device according to claim 17, wherein hub flange is freely axially mounted on said hub, and said bearing also defines an axial bearing support for said hub flange.

19. A torsional damper device according to claim 17, wherein said one guide ring has an inner periphery meshing with said bearing and forming said radial restraining means.

* * * * *